US011008486B2

(12) United States Patent
Hoshino et al.

(10) Patent No.: US 11,008,486 B2
(45) Date of Patent: May 18, 2021

(54) COMPOSITION HAVING EXCELLENT ADHESIVENESS TO POLYOLEFINS

(71) Applicant: DENKA COMPANY LIMITED, Tokyo (JP)

(72) Inventors: Takako Hoshino, Tokyo (JP); Masaya Umeyama, Tokyo (JP); Yukihiko Yamashita, Gunma (JP)

(73) Assignee: DENKA COMPANY LIMITED, Tokyo (JP)

( * ) Notice: Subject to any disclaimer, the term of this patent is extended or adjusted under 35 U.S.C. 154(b) by 189 days.

(21) Appl. No.: 16/470,033

(22) PCT Filed: Dec. 15, 2017

(86) PCT No.: PCT/JP2017/045190
§ 371 (c)(1),
(2) Date: Jun. 14, 2019

(87) PCT Pub. No.: WO2018/110705
PCT Pub. Date: Jun. 21, 2018

(65) Prior Publication Data
US 2020/0102483 A1     Apr. 2, 2020

(30) Foreign Application Priority Data
Dec. 16, 2016   (JP) .............................. JP2016-244411

(51) Int. Cl.
| C09J 133/06 | (2006.01) |
| C09J 143/02 | (2006.01) |
| C08F 220/28 | (2006.01) |
| C08F 220/32 | (2006.01) |
| C09J 133/08 | (2006.01) |
| C09J 133/10 | (2006.01) |
| C08F 230/02 | (2006.01) |
| C09J 133/14 | (2006.01) |
| C08F 220/14 | (2006.01) |
| C08F 220/12 | (2006.01) |
| C08F 220/16 | (2006.01) |
| C08F 220/20 | (2006.01) |

(52) U.S. Cl.
CPC .......... C09J 133/14 (2013.01); C08F 220/14 (2013.01); C09J 133/062 (2013.01); *C08F 220/12* (2013.01); *C08F 220/16* (2013.01); *C08F 220/20* (2013.01); *C08F 220/281* (2020.02); *C08F 220/325* (2020.02); *C08F 230/02* (2013.01); *C09J 133/066* (2013.01); *C09J 133/068* (2013.01); *C09J 133/08* (2013.01); *C09J 133/10* (2013.01); *C09J 143/02* (2013.01)

(58) Field of Classification Search
None
See application file for complete search history.

(56) References Cited

U.S. PATENT DOCUMENTS

| 4,385,153 | A | 5/1983 | Ritter .............................. 524/522 |
| 4,676,858 | A | 6/1987 | Ritter ........................... 156/307.3 |
| 5,106,928 | A | 4/1992 | Skoultchi et al. ............. 526/196 |
| 5,122,061 | A | 6/1992 | Wakumoto et al. ........ 433/228.1 |
| 5,539,070 | A | 7/1996 | Zharov et al. ................. 526/198 |
| 5,616,796 | A | 4/1997 | Pocius et al. ...................... 564/9 |
| 5,684,102 | A | 11/1997 | Pocius et al. .................. 526/598 |
| 5,744,511 | A * | 4/1998 | Kazama .................. G03F 7/029 522/25 |
| 5,795,657 | A | 8/1998 | Pocius et al. .................. 428/516 |
| 5,872,197 | A | 2/1999 | Deviny ........................ 526/196 |
| 6,383,655 | B1 * | 5/2002 | Moren ...................... B32B 7/12 428/522 |
| 2003/0226472 | A1 * | 12/2003 | Kneafsey .............. C08F 220/00 106/18.13 |
| 2004/0048070 | A1 | 3/2004 | Kendall et al. ............. 428/411.1 |
| 2004/0242817 | A1 * | 12/2004 | Kendall ..................... C09J 4/06 526/217 |
| 2005/0137370 | A1 | 6/2005 | Jialanella et al. ............. 526/227 |
| 2008/0045680 | A1 | 2/2008 | Jialanella et al. ............. 526/197 |
| 2009/0130180 | A1 * | 5/2009 | Kajita ..................... A61P 13/08 424/443 |
| 2012/0100293 | A1 | 4/2012 | Gutowski et al. ............ 427/341 |
| 2016/0144418 | A1 | 5/2016 | Nakamura et al. |

FOREIGN PATENT DOCUMENTS

| EP | 2 268 690 A1 | 10/2009 |
| JP | S 57-108102 A | 7/1982 |
| JP | S 58-84802 A | 5/1983 |
| JP | S 63-221181 A | 9/1988 |

(Continued)

OTHER PUBLICATIONS

European Office Action dated Nov. 13, 2020, issued to corresponding European Application No. 17 879 789.0.

(Continued)

Primary Examiner — Richard A Huhn
(74) Attorney, Agent, or Firm — Stein IP, LLC

(57) ABSTRACT

A composition having excellent adhesiveness to poorly adhesive materials such as polyolefins is provided. The solution is a composition comprising the following (1) to (2): (1) (meth)acrylates containing the following (1-1) to (1-3): (1-1) a (meth)acrylate having a hydroxyl group, (1-2) an alkyl (meth)acrylate, and (1-3) a (meth)acrylate having a cyclic ether skeleton, and (2) an organoboron compound. The content ratio of (1-1), (1-2), and (1-3) is (1-1):(1-2):(1-3)=(10 to 90):(5 to 80):(5 to 80) in mass ratio in 100 parts by mass of (1) (meth)acrylates.

12 Claims, No Drawings

(56) References Cited

FOREIGN PATENT DOCUMENTS

| JP | H 5-98216 A | 4/1993 |
|---|---|---|
| JP | H 8-119822 A | 5/1996 |
| JP | H 09-003109 A | 1/1997 |
| JP | H 9-3109 A | 1/1997 |
| JP | H11-512123 A | 10/1999 |
| JP | 2000-504353 A | 4/2000 |
| JP | 2004-149808 A | 5/2004 |
| JP | 2007-515547 A | 6/2007 |
| JP | 4035634 62 | 11/2007 |
| JP | 2012-530601 A | 12/2012 |
| JP | 2016-47901 A | 4/2016 |
| WO | WO 2012/160452 A1 | 11/2012 |
| WO | WO 2013/151680 A1 | 10/2013 |
| WO | WO 2016/077166 A1 | 5/2016 |

OTHER PUBLICATIONS

Briggs et al., "6.2.2 Non-methyl methacrylate adhesives", Briggs et al., David A. Dillard, Advances in structural adhesive bonding, Cambridge CB21 6AH UK, CRC Press Woodhead Publishing Limited, (2010), pp. 138-139, ISBN 978-1-84569-805-8, XP002794553.
European Office Action dated Jul. 1, 2020, issued by the European Patent Office in corresponding application EP 17 879 789.0.
English Translation of the International Preliminary Report on Patentability dated Mar. 20, 2018, issued to International Application No. PCT/JP2017/045190.

* cited by examiner

COMPOSITION HAVING EXCELLENT ADHESIVENESS TO POLYOLEFINS

CROSS-REFERENCE TO RELATED APPLICATIONS

This application is a national stage of International Application No. PCT/JP2017/045190 filed Dec. 15, 2017, which claims the benefit of priority to Japanese Application No. 2016-244411, filed Dec. 16, 2016, in the Japanese Patent Office, the disclosures of which are incorporated herein in their entireties by reference.

TECHNICAL FIELD

The present invention relates to a composition having excellent adhesiveness to poor adherends, for example, polyolefins.

BACKGROUND ART

Polyolefins typified by polyethylene, polypropylene, and the like are used in various fields as materials for automobile components, electrical components, building materials, food packaging films, and the like. Polyolefins are nonpolar materials and known as poor adherends.

On the other hand, two-part main agent type acrylic adhesives (also referred to as "two-part acrylic adhesives") are characterized by curing at room temperature in a short time, being less influenced by mixing ratio difference, and being excellent in balance between adhesion and peeling, and used in various fields as structural adhesives.

However, the two-part acrylic adhesives have low adhesiveness to polyolefins like other adhesives and therefore are difficult to apply to the adhesion of polyolefins.

In the case of adhesion to these poor adherends, surface treatment such as flame treatment, ITRO treatment, corona discharge, plasma treatment, oxidation by ozone or an acid, or sputter etching is often required. In the case of adhesion to the poor adherends, the surface of the adherends may be coated using a primer, but the above surface treatment is often required even for primer adhesion, and sufficient adhesiveness may not be obtained even if the treatment is performed.

Patent Literature 1 discloses a synthetic substance comprising an organoboron compound, a compound comprising an ethylene bond, and an inhibitor or a stabilizer for anionic polymerization. But, the composition described in Patent Literature 1 needs to be synthesized and stored in the absence of oxygen because as soon as it comes into contact with air, a curing reaction starts. In Patent Literature 1, metals, wood, glass, ceramics, and synthetic resins are mentioned as objects to have adhered, but only metals are described in Examples, and it is not shown that adhesion to polyolefins is possible.

Patent Literatures 2 to 4 disclose adhesives containing an organoboron compound. Patent Literatures 5 and 6 disclose compositions containing a trialkylboron or an oxide thereof as dental adhesives. But, Patent Literatures 2 to 6 do not describe using a particular amount of a particular (meth)acrylate.

CITATION LIST

Patent Literature

Patent Literature 1: Japanese Patent Laid-Open No. 57-108102
Patent Literature 2: Japanese Patent Laid-Open No. 58-084802
Patent Literature 3: Japanese Patent Laid-Open No. 2004-149808
Patent Literature 4: Japanese Patent Laid-Open No. 5-98216
Patent Literature 5: Japanese Patent Laid-Open No. 63-221181
Patent Literature 6: Japanese Patent Laid-Open No. 8-119822

SUMMARY OF INVENTION

Technical Problem

The present invention has been made in view of the above problems and provides a composition exhibiting excellent adhesiveness to poor adherends such as polyolefins.

Solution to Problem

Specifically, the present invention may be as follows.
<1> A composition comprising the following (1) to (2),
(1) (meth)acrylates containing the following (1-1) to (1-3):
  (1-1) a (meth)acrylate having a hydroxyl group,
  (1-2) an alkyl (meth)acrylate, and
  (1-3) a (meth)acrylate having a cyclic ether skeleton; and
(2) an organoboron compound,
wherein a content ratio of (1-1), (1-2), and (1-3) is (1-1):(1-2):(1-3)=(10 to 90):(5 to 80):(5 to 80), as mass ratio, in 100 parts by mass of (1) (meth)acrylates.
<2> The composition according to <1>, further comprising (3) a phosphate.
<3> The composition according to <2>, wherein the (3) phosphate is a phosphate represented by general formula (A),

[Formula 1]

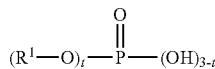

general formula (A)

wherein $R^1$ represents a group comprising a saturated or unsaturated hydrocarbon having 1 to 30 carbon atoms, or a $CH_2=CR^2C(O)O-(R^3)_u-$ group,
wherein $R^2$ represents hydrogen or a methyl group, and $R^3$ represents $-C_2H_4-$, $-C_3H_6-$, $-CH_2CH(CH_3)-$, $-C_4H_8-$, $-C_6H_{12}-$, or

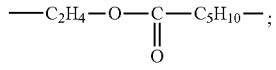

and t represents an integer of 1 or 2; and u represents an integer of 1 to 10.
<4> The composition according to any one of <1>-<3>, wherein the (2) organoboron compound is an alkylborane-amine complex.
<5> The composition according to <4>, wherein the alkylborane-amine complex is one or more of the group consisting of a triethylborane-1,3-diaminopropane complex, a triethylborane-diethylenetriamine complex, and a tributylborane-3-methoxy-1-propylamine complex.

<6> The composition according to any one of <1>-<5>, wherein an amount of the (2) organoboron compound used is 0.01 to 10 parts by mass based on 100 parts by mass of the (1) (meth)acrylates.
<7> The composition according to <2> or <3>, wherein an amount of the (3) phosphate used is 1 to 20 parts by mass based on 100 parts by mass of the (1) (meth)acrylates.
<8> A two-part composition comprising a first agent and a second agent,
wherein the composition according to <2> or <3> is divided into the first agent and the second agent, and
wherein the first agent contains at least the (2) organoboron compound, and the second agent contains at least the (3) phosphate.
<9> A curable resin composition comprising the composition according to any one of <1>-<8>.
<10> An adhesive composition comprising the composition according to any one of <1>-<8>.
<11> The adhesive composition according to <10>, used for adhesion of an adherend comprising one or more of the group consisting of polyolefin, cycloolefin, polystyrene, and a fiber-reinforced plastic.
<12> A joined body joined by the adhesive composition according to <10> or <11>.

Advantageous Effects of Invention

The present invention has adhesiveness to poor adherends such as polyolefins.

DESCRIPTION OF EMBODIMENTS

The (1) (meth)acrylates used in the embodiment are compounds having a (meth)acryloyl group. The (meth)acrylates may preferably be monomers. The (meth)acryloyl group means an "acryloyl group" or a "methacryloyl group". The (meth)acrylate means an "acrylate" or a "methacrylate". When the composition of the present invention is used by dividing it into a first agent and a second agent, the "amount used" of each component refers to the total of the amount of the component in the first agent and the second agent.

The (1) (meth)acrylates used in the embodiment contain (1-1) a (meth)acrylate having a hydroxyl group, (1-2) an alkyl (meth)acrylate, and (1-3) a (meth)acrylate having a cyclic ether skeleton. For the (1) (meth)acrylates, as the (1-1) (meth)acrylate having a hydroxyl group, the (1-2) alkyl (meth)acrylate, and the (1-3) (meth)acrylate having a cyclic ether skeleton, monofunctional (meth)acrylates having one (meth)acryloyl group are preferred.

(1-1) (Meth)acrylate Having Hydroxyl Group

As the (meth)acrylate having a hydroxyl group, a (meth)acrylic monomer represented by general formula (B) is preferred.

[Formula 2]

$$Z—O—(R^4O)_s—H \quad \text{general formula (B)}$$

wherein z represents a (meth)acryloyl group, $R^4$ represents $—C_2H_4—$, $—C_3H_6—$, $—CH_2CH(CH_3)$ $C_4H_8—$, or $—C_6H_{12}—$, and s represents an integer of 1 to 10.

As the (meth)acrylate, hydroxyalkyl (meth)acrylates such as 2-hydroxyethyl (meth)acrylate, 2-hydroxypropyl (meth)acrylate, and hydroxybutyl (meth)acrylate may be preferred. One or more of these may be used.

(1-2) Alkyl (Meth)acrylate

As the alkyl (meth)acrylate, a (meth)acrylate represented by general formula (C) is preferred.

[Formula 3]

$$Z—O—R^5 \quad \text{general formula (C)}$$

wherein z represents a (meth)acryloyl group, and $R^5$ represents an alkyl group having 1 to 20 carbon atoms.

Examples of the (meth)acrylate may include methyl (meth)acrylate, ethyl (meth)acrylate, propyl (meth)acrylate, 2-ethylhexyl (meth)acrylate, isopropyl (meth)acrylate, butyl (meth)acrylate, isobutyl (meth)acrylate, and isooctyl (meth)acrylate. One or more of these may be used. Among these, alkyl (meth)acrylates having 4 or more carbon atoms may be preferred. Among alkyl (meth)acrylates having 4 or more carbon atoms, one or more of the group consisting of isooctyl (meth)acrylate, branched nonyl (meth)acrylate, and 2-ethylhexyl (meth)acrylate may be preferred. Among alkyl (meth)acrylates, long chain alkyl (meth)acrylates or branched alkyl (meth)acrylates may be preferred.

(1-3) (Meth)acrylate Having Cyclic Ether Skeleton

Examples of the (meth)acrylate having a cyclic ether skeleton may include glycidyl (meth)acrylate, furfuryl (meth)acrylate, tetrahydrofurfuryl (meth)acrylate, 3-ethyl-3-oxetanylmethyl (meth)acrylate, (2-methyl-ethyl-1,3-dioxolan-4-yl)methyl (meth)acrylate, cyclic trimethylolpropane formal (meth)acrylate, γ-butyrolactone (meth)acrylate, dioxolane (meth)acrylate, dioxane glycol di(meth)acrylate, and oxetane (meth)acrylate. One or more of these may be used. Among cyclic ether skeletons, five- or six-membered rings may be preferred. The cyclic ether skeleton may preferably have one oxygen atom. The cyclic ether skeleton may preferably have 2 to 5 carbon atoms. Among (meth)acrylates having a cyclic ether skeleton, tetrahydrofurfuryl (meth)acrylate may be preferred.

The content ratio of the (1) (meth)acrylates containing the (1-1) (meth)acrylate having a hydroxyl group, the (1-2) alkyl (meth)acrylate, and the (1-3) (meth)acrylate having a cyclic ether skeleton may preferably be (1-1):(1-2):(1-3)=(10 to 90):(5 to 80):(5 to 80), more preferably (20 to 60):(10 to 50):(10 to 50), and most preferably (30 to 50):(20 to 40):(20 to 40) in mass ratio in 100 parts by mass of the (1) (meth)acrylates.

The (1) (meth)acrylates may preferably comprise three components such as the (1-1) (meth)acrylate having a hydroxyl group, the (1-2) alkyl (meth)acrylate, and the (1-3) (meth)acrylate having a cyclic ether skeleton.

The (2) organoboron compound used in the embodiment is a complex having a boron atom. The (2) organoboron compound, for example, acts as a polymerization initiator for the (meth)acrylates. Among organoboron compounds, alkylborane complexes are preferred. Among alkylborane complexes, alkylborane-amine complexes are preferred. The alkylborane-amine complexes are complexes obtained by coordinating amines to alkylboranes. Examples of the alkylborane-amine complexes include a triethylborane-diaminopropane complex such as a triethylborane-1,3-diaminopropane complex, a triethylborane-diethylenetriamine complex, a tributylborane-3-methoxy-1-propylamine complex, a tributylborane-1,3-diaminopropane complex, and a tri-isobutylborane-1,3-diaminopropane complex. One or more of these can be used. Among these, one or more of the group consisting of a triethylborane-diaminopropane complex and a triethylborane-diethylenetriamine complex are preferred, and a triethylborane-diethylenetriamine complex is more preferred.

The amount of the organoboron compound used in the embodiment is preferably 0.01 to 10 parts by mass, more preferably 0.1 to 5 parts by mass, and most preferably 0.2 to 4 parts by mass based on 100 parts by mass of the (1) (meth)acrylates. When the amount is 0.1 parts by mass or more, the adhesiveness improves. When the amount is 5 parts by mass or less, the curing reaction is not too fast, and the workability does not decrease.

Further, in the embodiment, (3) a phosphate may be used. The (3) phosphate, for example, may act as a curing accelerator for the (meth)acrylates. As the (3) phosphate used in the embodiment, a compound represented by general formula (A) may be preferred.

[Formula 4]

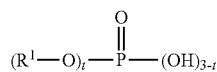

general formula (A)

wherein $R^1$ represents a group comprising a saturated or unsaturated hydrocarbon having 1 to 30 carbon atoms, or a $CH_2=CR^2C(O)O-(R^3)_u-$ group, wherein $R^2$ represents hydrogen or a methyl group, and $R^3$ represents $-C_2H_4-$, $-C_3H_6-$, $-CH_2CH(CH_3)-$, $-C_4H_8-$, $-C_6H_{12}-$, or

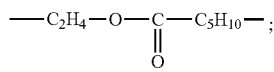

t represents an integer of 1 or 2; and u represents an integer of 1 to 10.

$R^1$ may preferably be one or more of the group consisting of a group comprising a saturated or unsaturated hydrocarbon having 1 to 20 carbon atoms, and $CH_2=CR^2C(O)O-(R^3)_u-$ group, more preferably $CH_2=CR^2C(O)O-(R^3)_u-$ group, in terms of high reactivity with the component (2).

When $R^1$ is a group comprising a saturated or unsaturated hydrocarbon having 1 to 20 carbon atoms, 2-ethylhexyl acid phosphate may be preferred as the (3) phosphate. When $R^1$ is $CH_2=CR^2C(O)O-(R^3)_u-$ group, acid phosphooxyethyl (meth)acrylate may be preferred as the (3) phosphate.

Examples of the phosphate may include ethyl acid phosphate, butyl acid phosphate, dibutyl pyrophosphate, butoxyethyl acid phosphate, 2-ethylhexyl acid phosphate, alkyl (C12, C14, C16, or C18) acid phosphates, isotridecyl acid phosphate, oleyl acid phosphate, tetracosyl acid phosphate, dibutyl phosphate, bis(2-ethylhexyl) phosphate, acid phosphooxyethyl (meth)acrylate, acid phosphooxypropyl (meth) acrylate, and bis(2-(meth)acryloyloxyethyl) phosphate, and butyl glycol ether acid phosphate. One or more of these may be used. Among these, one or more of the group consisting of 2-ethylhexyl acid phosphate and acid phosphooxyethyl (meth)acrylate may be preferred, and acid phosphooxyethyl (meth)acrylate may be preferred, in terms of high reactivity with the component (2).

The amount of the phosphate used in the embodiment may preferably be 1 to 20 parts by mass, more preferably 1.0 to 10 parts by mass, and most preferably 1.5 to 8.0 parts by mass based on 100 parts by mass of the (1) (meth)acrylates. When the amount is 1.0 part by mass or more, adhesiveness appears. When the amount is 10 parts by mass or less, the curing reaction is not too fast, and the workability does not decrease.

The composition in the embodiment may also contain an elastomer component and a resin containing no (meth) acrylate group.

Various paraffin may be used in the composition in the embodiment in order to speed up the curing of a portion in contact with air.

Various antioxidants including polymerization inhibitors, and the like may be used in the composition in the embodiment for the purpose of improving storage stability.

In addition to these, already known substances such as a coupling agent, a plasticizer, a filler, a colorant, and a preservative may also be used as desired.

As the implementation in the embodiment, use as a two-part composition may be preferred. For the two-part composition, not all the essential components of the composition in the embodiment are mixed together during storage, but the composition is divided into a first agent and a second agent, and the first agent and the second agent contain at least the component (2) and at least component (3), respectively. In this case, use as a two-part composition is possible by simultaneously or separately applying both agents to an adherend or adherends followed by contact and curing.

The composition in the embodiment does not require accurate measurement of two agents and cures at ordinary temperature by incomplete measurement and mixing and sometimes even by only the contact of two agents. Ultraviolet rays are not required for the curing of the composition in the embodiment. The composition in the embodiment is excellent in workability.

The composition in the embodiment may be used as a curable resin composition. In addition, the composition in the embodiment may be used as an adhesive composition.

The adhesive composition in the embodiment may preferably be used for an adherend. As the adherend, one or more of the group consisting of polyolefins such as polypropylene and polyethylene, cycloolefins, polystyrene, and fiber-reinforced plastics are preferred. The fiber-reinforced plastic is, for example, a plastic containing fibers. As the fibers, carbon fibers may be preferred. As the plastic, polyolefins may be preferred. The embodiment has excellent adhesiveness to poor adherends such as polyolefins and polyolefins containing fibers.

EXAMPLES

The embodiment will be described below by Examples, but the embodiment is not limited to these Examples. The units of the amounts of materials used are expressed in parts by mass. For the materials used, the following abbreviations are used.

Examples 1 to 5

Materials used were mixed with a composition in Table 1 to prepare an adhesive composition comprising a first agent and a second agent. The results are shown in Table 1.
(Materials Used)
2-Hydroxypropyl methacrylate: commercial product
Tetrahydrofurfuryl methacrylate: commercial product
Isooctyl acrylate: commercial product
Alkylborane-amine complex: trade name "TEB-DETA" (triethylborane-diethylenetriamine complex manufactured by BASF)

Alkylborane-amine complex: trade name "TEB-DAP" (triethylborane-diaminopropane complex manufactured by BASF)
Phosphate: commercial product, acid phosphooxyethyl methacrylate, t=1 in general formula (A)
Phosphate: commercial product, 2-ethylhexyl acid phosphate, t=1 to 2 in general formula (A)
PP: polypropylene test piece, commercial product
CFR-PP: test piece of polypropylene containing carbon fibers, commercial product Physical properties were measured as follows.

[Tensile Shear Strength (Tensile Shear Adhesive Strength (Adherends: PP))]

According to JIS K-6856, a mixture of equal amounts of a first agent and a second agent was applied to one side of a test piece (25 mm×25 mm×0.7 mm t, PP), and then another test piece (25 mm×25 mm×2 mm t, PP) was immediately superimposed and bonded followed by aging at room temperature for 24 hours to provide a sample. The tensile shear strength (unit: MPa) of the sample was measured in an environment of a temperature of 23° C. and a humidity of 50% RH at a tensile speed of 10 mm/min. As the fractured state of the adhered composite material, fracture at the interface between the substrate and the adhesive was taken as "interface fracture", fracture inside the adhesive layer was taken as "cohesive fracture", and the fracture or breakage of the substrate or the value indicating the yield point of the substrates was taken as "material fracture". For PP, the state in which the yield point was exhibited at 4 MPa, and the substrates elongated was taken as "material fracture". "Material fracture" is preferred in that the adhesiveness at the interfaces between the test pieces and the adhesive is high.

[Tensile Shear Strength (Tensile Shear Adhesive Strength (Adherends: CFR-PP))]

According to JIS K-6856, a mixture of equal amounts of a first agent and a second agent was applied to one side of a test piece (25 mm×25 mm×0.7 mm t, CFR-PP), and then another test piece (25 mm×25 mm×2 mm t, CFR-PP) was immediately superimposed and bonded followed by aging at room temperature for 24 hours to provide a sample. The tensile shear strength (unit: MPa) of the sample was measured in an environment of a temperature of 23° C. and a humidity of 50% RH at a tensile speed of 10 mm/min. As the fractured state of the adhered composite material, fracture at the interface between the substrate and the adhesive was taken as "interface fracture", fracture inside the adhesive layer was taken as "cohesive fracture", and the fracture or breakage of the substrate or the value indicating the yield point of the substrates was taken as "material fracture". "Material fracture" is preferred in that the adhesiveness at the interfaces between the test pieces and the adhesive is high.

TABLE 1

| | Component | Name | Example 1 | Example 2 | Example 3 | Example 4 | Example 5 |
|---|---|---|---|---|---|---|---|
| First agent | (1-1) | 2-Hydroxypropyl methacrylate | 40 | 40 | 40 | 40 | 40 |
| | (1-2) | Isooctyl acrylate | 30 | 30 | 30 | 30 | 30 |
| | (1-3) | Tetrahydrofurfuryl methacrylate | 30 | 30 | 30 | 30 | 30 |
| | (2) | Triethylborane-diaminopropane complex | 1 | 1 | 0 | 1 | 0 |
| | | Triethylborane-diethylenetriamine complex | 0 | 0 | 1 | 0 | 1 |
| Second agent | (1-1) | 2-Hydroxypropyl methacrylate | 40 | 40 | 40 | 40 | 40 |
| | (1-2) | Isooctyl acrylate | 30 | 30 | 30 | 30 | 30 |
| | (1-3) | Tetrahydrofurfuryl methacrylate | 30 | 30 | 30 | 30 | 30 |
| | (3) | Acid phosphooxyethyl methacrylate | 2 | 0 | 2 | 6 | 6 |
| | | 2-Ethylhexyl acid phosphate | 0 | 2 | 0 | 0 | 0 |
| Measurement results | | Tensile shear adhesive strength (adherends: PP) | Material fracture | Material fracture | Material fracture | Material fracture | Material fracture |
| | | Tensile shear adhesive strength (adherends: CFR-PP) | 6.8 MPa Cohesive fracture | 6.2 MPa Cohesive fracture | 7.3 MPa Cohesive fracture | 7.0 MPa Cohesive fracture | 8.0 MPa Cohesive fracture |

The units are parts by mass.

Comparative Example 1

An adhesive composition was made and evaluated as in Example 1 except that the composition was changed to the composition in Table 2. The results are shown in Table 2.

(Materials Used)
Cumene hydroperoxide: commercial product
Vanadyl acetylacetonate: commercial product

TABLE 2

| | Component | Name | Comparative Example 1 |
|---|---|---|---|
| First agent | (1-1) | 2-Hydroxypropyl methacrylate | 40 |
| | (1-2) | Isooctyl acrylate | 30 |
| | (1-3) | Tetrahydrofurfuryl methacrylate | 30 |
| | (2) | Triethylborane-diethylenetriamine complex | 0 |
| | | Cumene hydroperoxide | 3 |
| Second agent | (1-1) | 2-Hydroxypropyl methacrylate | 40 |
| | (1-2) | Isooctyl acrylate | 30 |
| | (1-3) | Tetrahydrofurfuryl methacrylate | 30 |
| | (3) | Acid phosphooxyethyl methacrylate | 0 |
| | | Vanadyl acetylacetonate | 1 |

In the adhesive compositions of Examples 1 to 5, the adhesiveness is high with respect to polypropylene and polypropylene containing carbon fibers. On the other hand, in Comparative Example 1, no organoboron compound is contained, and therefore the adhesiveness is low.

INDUSTRIAL APPLICABILITY

The embodiment has adhesiveness to poor adherends such as polyolefins (for example, polypropylene and polyethylene). Therefore the embodiment may easily adhere automobile components, electrical components, and the like.

The invention claimed is:

1. A composition comprising the following (1) to (2): (1) (meth)acrylates containing the following (1-1) to (1-3):
   (1-1) a (meth)acrylate having a hydroxyl group,
   (1-2) an alkyl (meth)acrylate, and
   (1-3) a (meth)acrylate having a cyclic ether skeleton; and
   (2) an organoboron compound,
   wherein a content ratio of (1-1), (1-2), and (1-3) is (1-1):(1-2):(1-3)=(10 to 90):(5 to 80):(5 to 80) in mass ratio in 100 parts by mass of (1) (meth)acrylates.

2. The composition according to claim 1, further comprising (3) a phosphate.

3. The composition according to claim 2, wherein the (3) phosphate is a phosphate represented by general formula (A),

[Formula 1]

general formula (A)

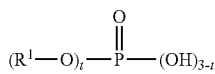

wherein $R^1$ represents a group comprising a saturated or unsaturated hydrocarbon having 1 to 30 carbon atoms, or a $CH_2\!\!=\!\!CR^2C(O)O\!\!-\!\!(R^3)_u\!\!-$ group,
wherein $R^2$ represents hydrogen or a methyl group, and $R^3$ represents $-C_2H_4-$, $-C_3H_6-$, $-CH_2CH(CH_3)-$, $-C_6H_{12}-$, or

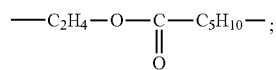

and t represents an integer of 1 or 2; and u represents an integer of 1 to 10.

4. The composition according to claim 1, wherein the (2) organoboron compound is an alkylborane-amine complex.

5. The composition according to claim 4, wherein the alkylborane-amine complex is one or more of the group consisting of a triethylborane-1,3-diaminopropane complex, a triethylborane-diethylenetriamine complex, and a tributylborane-3-methoxy-1-propylamine complex.

6. The composition according to claim 1, wherein an amount of the (2) organoboron compound used is 0.01 to 10 parts by mass based on 100 parts by mass of the (1) (meth)acrylates.

7. The composition according to claim 2, wherein an amount of the (3) phosphate used is 1 to 20 parts by mass based on 100 parts by mass of the (1) (meth)acrylates.

8. A two-part composition comprising a first agent and a second agent,
   wherein the composition according to claim 2 is divided into the first agent and the second agent, and the first agent contains at least the (2) organoboron compound, and the second agent contains at least the (3) phosphate.

9. A curable resin composition comprising the composition according to claim 1.

10. An adhesive composition comprising the composition according to claim 1.

11. The adhesive composition according to claim 10, used for adhesion of an adherend comprising one or more of the group consisting of polyolefin, cycloolefin, polystyrene, and a fiber-reinforced plastic.

12. A joined body joined by the adhesive composition according to claim 10.

* * * * *